Patented May 15, 1934

1,959,320

UNITED STATES PATENT OFFICE 1,959,320

METHOD FOR USE IN SECURING TOGETHER PARTS OF SHOES AND OTHER ARTICLES

Walter Herbert Wedger, Belmont, Mass., assignor to Boston Blacking & Chemical Co., Boston, Mass., a corporation of Massachusetts No Drawing. Application January 12, 1931, Serial No. 508,368

15 Claims. (Cl. 12—142)

This invention relates to improvements in methods of securing together pieces of stock with pyroxylin or other cellulose-ester cement wherein the cement is applied to pieces of stock, the cement permitted to dry, and subsequently activated, whereupon the pieces of stock are brought together and placed under pressure. More particularly, this invention involves the activating or cutting of such hardened cement in such a manner that, while ample time is permitted for the assembling of the stock in the desired relation and the application of pressure by suitable means, the cement will harden quickly after pressure is applied so that the pressure need be maintained for only a short period. The invention is disclosed herein with particular reference to the manufacture of compo shoes, that is shoes the soles of which are secured to the overlasted portions of their uppers by cement instead of by stitching, nails or pegs, though it is obvious that the invention in various of its phases is in no way limited to use in such work.

The compositions disclosed herein are claimed in my copending divisional application, Serial No. 719,747, filed April 9, 1934.

During the last few years there have been manufactured in this country an increasing number of shoes of this character in which the soles are secured to the uppers with pyroxylin cement. The overlasted portions of the shoe uppers and the marginal portions of the soles are buffed or scoured and pyroxylin cement is applied to the buffed or scoured portions and left to dry or harden. Then the cement on one or both of these parts (according to the most modern practice, the cement upon the sole only) is cut or softened with a suitable solvent, the shoe and the sole are assembled in the desired relation, and pressure is applied to clamp the sole and the shoe together while the cement sets. The shoe and sole may be positioned and the pressure applied in a machine, for example, such as that disclosed in United States Letters Patent No. 1,897,105, granted February 14, 1933, on an application of Milton H. Ballard.

With the solvents which have heretofore been used to cut or soften the pyroxylin cement, it has been necessary to maintain each shoe and sole under pressure for some 20 to 30 minutes, and, if the pressure was maintained through a less period, there was danger of the joint failing, either immediately or after the shoe has been worn a short time. It has been necessary to allow from 25 to 30 seconds for the operator to apply the solvent to the sole, assemble or position the shoe and sole relatively to each other and to the pressure-applying means, and to start the application of pressure. Experiments have been made with pyroxylin solvents having boiling points lower than those generally used, for example with mixtures of acetone and ethyl ether. The difficulty with such solvents is that, while they do speed up the setting of the cement so that the pressure can be released after a much shorter period than the 20 to 30 minutes ordinarily allowed, they evaporate so rapidly during the assembling of the shoe and the sole as well as while the solvent is being applied to the sole that there is insufficient cutting or softening of the dried and hardened pyroxylin cement, and a poor joint, which cannot be relied upon to hold, is formed. Experiments have shown, nevertheless, that if, as may be done under laboratory conditions, such a solvent is applied sufficiently rapidly and the parts are assembled and put under pressure all within a period of 5 to 10 seconds, a good reliable joint can be obtained.

It is an object of the present invention to provide a method of cutting pyroxylin cement, of such a nature that a period of time up to 25 to 30 seconds may be taken to apply the solvent, assemble the parts and put them under pressure, notwithstanding which the pressure may be removed within a much shorter time than has heretofore been possible, for example after 5 or 6 minutes, or even less, according to the nature of the work. This very substantial shortening of the length of time that the shoes need to be kept under pressure correspondingly decreases the number of pressure-applying devices with which each workman must be supplied for attaching soles in the manufacture of compo shoes. As these clamping devices are relatively expensive, the saving in the cost of equipment necessary in a shoe factory manufacturing 1,000 parts per day of this type of shoe may be as much as twelve or fifteen hundred dollars.

As illustrated herein, this is accomplished by activating the hardened cement with a selected low-boiling pyroxylin solvent containing in solution a substance or substances which, without deleteriously affecting the solvent, will, when present in relatively small quantities, slow down the evaporation while the solvent is being applied and while the pieces of stock (for example, the shoe and sole) are being assembled, but permit, nevertheless, a rapid setting of the cement when the pressure is applied. Apparently, when, for example, the softening composition is applied to one of two cement-coated pieces of stock to be assembled under pressure, a portion of the liquid solvent evaporates rapidly at room temperature to cause the gelling of a portion of the dissolved material in the form of a thin skin on the surface of the softening composition, which skin retards the evaporation of the solvent therebeneath, thereby protecting it while it cuts or softens the cement on the stock. The skin, however, is disrupted when the pressure is applied so that the highly volatile solvent may also soften the hardened cement on the second piece of stock and be speedily evaporated or dissipated just as it would be if it had been free from the added substances.

An example of a composition made in accordance with my invention is as follows:—

```
300 cc_____ C. P. acetone
100 cc_____ Ethyl ether
 42 grams_____ Gum camphor
 15 grams_____ Rezyl balsam
  9 grams__ 330-second viscosity nitrocellulose.
```

The above, it will be observed, contains about 83% of a mixture of one part ethyl ether and three parts acetone, about 11% gum camphor, about 4% rezyl balsam, and something over 2% of a 330-second viscosity nitrocellulose (figuring the specific gravity of acetone as 0.79 and of ethyl ether as 0.72). These percentages can, however, be varied to a substantial extent. Attention is called at this time to the high viscosity of the nitrocellulose employed. If nitrocellulose having a lower viscosity is used, then the amount necessary is correspondingly increased. Thus, 12 grams of a 240-second viscosity nitrocellulose will have substantially the same effect as 9 grams of a 330-second viscosity.

The standard of viscosity of nitrocellulose as referred to above is that described in a bulletin of the American Society for Testing Materials, entitled "Tentative specifications and tests for soluble nitrocellulose", issued 1929, revised 1930, from which the following is quoted:—

"*Consistency, film and toluol dilution tests solutions required*

"10. The solutions used shall conform to the following formulas:

|  | Formula— | | | |
| --- | --- | --- | --- | --- |
|  | A | B | C | D |
| Soluble nitrocellulose (dried at 50° C. to constant weight), percent by weight | 12.2 | 20.0 | 25.0 | 12.2 |
| Ethyl acetate,ᵃ percent by weight | 17.5 | 16.0 | 15.0 | |
| Denatured alcohol, commercially distilled (No. 1, 188-proof) percent by weight | 22.0 | 20.0 | 18.75 | |
| Toluol,ᵇ percent by weight | 48.3 | 44.0 | 41.25 | |
| Normal butyl acetate,ᶜ percent by weight | | | | 87.8 |

"ᵃ Ethyl acetate conforming to the requirements of the Tentative Specifications for Ethyl Acetate (85 to 88 percent Grade) (A.S.T.M. Designation: D 302-30T) of the American Society for Testing Materials.
"ᵇ Non-corrosive toluol, 2° C. boiling range, including the boiling point of toluene, 110.7° C.
"ᶜ Normal butyl acetate conforming to the requirements of the Tentative Specifications for Normal Butyl Acetate (88 to 92 percent Grade) (A.S.T.M. Designation: D 303-30T) of the American Society for Testing Materials.

"*Consistency*

"11. (a) *Cylinder.*—A glass cylinder 1.0 in. ±0.02 in. (25.4 mm. ±0.5 mm.) in. inside diameter. 14 in. in height, and with marks 10.0 in. ±0.10 in. (254.00 mm. ±0.25 mm.) on the side at points about 2 and 12 in. from the top.

"(b) *Steel Ball.*—A steel ball 0.3120 to 0.3130 in. (0.794 cm. ÷0.001 cm.) in diameter and weighing 2.035 g. ±0.010 g.

"12. (a) *Consistency (Viscosity).*—Consistency is determined by putting the soluble nitrocellulose in solution using a standard formula and noting the rate at which a standard steel ball drops through the solution.

"Formula A, B or C is usually used for determining consistency. Use Formula A unless the sample gives a viscosity with it of 6 seconds or less, in which case use Formula B, if below 3 seconds in Formula B use Formula C. The solution of the nitro-cellulose will be completed somewhat more quickly if the alcohol and toluol be added first and the mixture be then allowed to stand 5 or 10 minutes before the ethyl acetate is added. Completely dissolve the sample in the solvent mixture by agitating in a tightly closed container. Fill the glass cylinder with this solution. Stopper the cylinder, allow to stand until all air bubbles have passed out of the solution and bring to a temperature of 25.0° C. ±0.1° C. Place the cylinder in a vertical position and release the steel ball at the center of the upper surface of the solution and allow it to fall through the solution. The number of seconds required for the ball to pass through the 10-in. column of solution between the 2 and 12-in. marks on the cylinder, is recorded as the consistency of the sample."

The rezyl balsam referred to above is a well-known, commercial, synthetic resin, being a balsamic ester of phthalic anhydride and diethylene glycol, preferably containing also a drying or semi-drying oil, such as tung or China wood oil, and which may be made by the methods described in Letters Patent of the United States No. 1,690,515, granted November 6, 1928 on an application filed in the name of Harry M. Webber, by substituting di-ethylene glycol for the glycerol referred to in the patent.

Other soft synthetic resins which are solid solvents for nitrocellulose and are soluble in the pyroxylin solvents employed, for example soft santolite resin, may be used in place of the rezyl balsam, though at this time rezyl balsam has the advantage of costing substantially less than such other suitable resins.

Various liquids, which are solvents for pyroxylin or nitrocellulose, may be used in making up the composition. An essential point is, however, that the solvent shall be relatively volatile at atmospheric temperature, that is, it shall have a low boiling point, preferably in the neighborhood of 40° to 50° C. Thus, in the place of acetone (boiling point about 56 C.) and ethyl ether (boiling point about 35° C.) mentioned above, a mixture of 60% ethyl alcohol (boiling point about 78° C.) and 40% ethyl ether may be used. Iso-propyl ether (boiling point about 69° C.) may be substituted for some of the ethyl ether. Ethyl acetate (boiling point about 77° C.) may be substituted for at least a portion of the acetone but, if it is used to the exclusion of the acetone, the resulting mixture of the softener with the cement becomes too "mushy". I find also that various hydrocarbons can be used in place of the ethyl ether and in larger portions than ethyl ether when mixed with acetone. Thus, a mixture of 50% mixed pentanes having a boiling range of about 30 to 40° C. with 50% acetone gives good results as the liquid portion of the mixture. If desired, moreover, when either ethyl ether or iso-propyl ether is used with acetone as the liquid portion of the composition, part of the ethyl ether or the iso-propyl ether may be replaced by a light hydrocarbon such as the pentanes just referred to. If a more volatile solvent is desired than those described above, it may be obtained by using, for example, one part of acetone to two parts of ethyl ether. This will allow less time for applying the solvent and manipulating the work before the pressure is applied but will result in the cement setting even more quickly after the pressure is applied.

It will be apparent from the above that there is nothing critical about the composition of the liquid portion of the solvent. The essential is that it must readily cut the hardened cement and have a sufficiently high vapor pressure at room temperature so that a portion of it will evaporate quickly to cause the formation of a surface film or skin entrapping a substantial portion of the solvent therebeneath and so that the remainder of the solvent will dissipate quickly after the pressure is applied but not until the hardened cement on the piece of stock has been softened.

A function of the high-viscosity nitrocellulose is to reduce the evaporation of the solvent while the parts, coated with previously hardened pyroxylin cement, are being assembled. Apparently, when the softening composition is exposed to the air at room temperature, part of the liquid portion of the solvent evaporates from the surface of the layer of softening composition on the work piece, causing a portion of the nitrocellulose to gell on the surface of the softening composition and form a skin which entraps the remainder of the liquid solvent therebeneath and retards further evaporation thereof, thus protecting such remaining liquid while it cuts and softens the pyroxylin to which it had been applied. It should be noted that the film-forming material, high-viscosity nitrocellulose in this example, is compatible with the cement to which the softening composition is applied, and, furthermore, does not impair the adhesiveness of the cement.

The camphor and the rezyl balsam both help in slowing down the evaporation of the liquid portion of the solvent during the assembling of the work. While I do not regard it as essential that either or both of these substances be employed, nevertheless I regard them or their equivalents as desirable since they add considerably to the effectiveness of the high-viscosity nitrocellulose and, like the high-viscosity nitrocellulose, have no deleterious effect. The camphor and rezyl balsam, being, respectively, solid, and solid or semi-solid softeners for nitrocellulose, tend to stabilize the composition, preventing precipitation of the nitrocellulose during the application of the solvent on a humid day. The rezyl balsam I believe also to be effective in maintaining an even distribution of the solvent, thus preventing the formation of bare spots and serving to produce a "cushioning" effect. Omission of the camphor reduces the retarding effect while the solvent is being applied and the parts assembled, although, if the assembling is carried out quickly enough, the joint will be good.

A factor in the speedy setting of the cement, when my invention is practiced, is the fact that the application of pressure reduces the viscosity of the solvent and the cement which it has cut, thus increasing the vapor tension and facilitating the dispersion and evaporation of the solvent and the setting of the cement. The increase in the viscosity of the solvent due to the dissolved substances is effective also to prevent marking of the outer surface of the sole by the solvent as by creeping of the solvent around the edge of the sole as occasionally happens under other conditions.

Tests which I have made indicate that cellulose acetate may be substituted for the high-viscosity nitrocellulose in the compositions described above for softening nitrocellulose cements. This is particularly desirable, perhaps actually necessary, if the softener is to be used for cutting cellulose acetate cement. Since the method and softener of my invention are applicable to work in which cellulose acetate cement or other cellulose derivative cements are utilized to secure together parts of shoes or other articles as well as to work in which nitrocellulose cements are used, the word "pyroxylin" in the claims should be taken in a sense sufficiently broad to include other suitable cellulose derivatives, for example, cellulose acetate as well as the nitrocelluloses.

In practicing the method of my invention in the manufacture of shoes, pyroxylin cement is applied in the usual fashion to the buffed or scoured overlasted portion of the shoe upper and to the buffed or scoured marginal portion of the sole and is allowed to dry and harden in the usual way. Then the cement on one or both of these parts, preferably on the sole, is activated or cut with one of the above-described compositions applied manually or by any suitable means, the sole and the shoe are assembled, and pressure is applied, for example with a machine such as that of said United States Letters Patent No. 1,897,105. It is found necessary, when the new softener is employed in conjunction with cements heretofore commercially available, to maintain the shoe and sole under pressure for no longer than four to six minutes (or much less, particularly if heat is employed), according to the nature and condition of the shoe parts and the shape of the last bottom, instead of from 20 to 30 minutes as has been the prior-art practice, and this notwithstanding the fact that the operator has ample time, as much as 30 seconds if desired, for applying the softener, assembling and positioning the shoe and the sole, and applying the pressure. This reduction in the time in which the shoe must remain under pressure permits an operator to keep busy with not more than ten to twenty of the pressure-applying devices, whereas with the solvents heretofore used it was necessary to supply each operator with from sixty to eighty, or even more, of the pressure-applying devices.

Having described my invention, what I claim as new and desire to secure by Letters Patent of the United States is:—

1. That improvement in methods of manufacturing shoes which comprises applying nitrocellulose cement to one or both of two shoe parts which are to be secured together, letting the cement harden, cutting the hardened cement on at least one of the shoe parts with a low boiling solvent for nitrocellulose containing a small amount of a high-viscosity nitrocellulose, assembling the shoe parts in the desired relation and holding them under pressure while the cement is setting.

2. That improvement in methods of securing together pieces of stock, which comprises applying pyroxylin cement to one or both of two pieces of stock which are to be secured together, letting the cement harden, and cutting the hardened cement on at least one of the pieces with a low-boiling solvent for pyroxylin containing a small amount of dissolved material which retards the evaporation of the solvent by forming a film on the surface thereof while the softening cement and solvent are exposed to the air, thereby allowing ample time for the pieces of stock to be assembled, assembling the pieces of stock in the desired relation, and applying pressure thereto, thereby terminating said retarding action so that the softened cement sets quickly.

3. That improvement in methods of securing together pieces of stock, which comprises applying nitrocellulose cement to one or both of two pieces of stock which are to be secured together, letting the cement dry, and cutting the dry cement on at least one of the pieces of stock with a low-boiling solvent for nitrocellulose containing in solution an effective amount of high-viscosity nitrocellulose, thereby slowing down the evaporation of the solvent while the pieces of stock are exposed to the air as they are being assembled.

4. That improvement in methods of securing together pieces of stock, which comprises applying nitrocellulose cement to one or both of two pieces of stock which are to be secured together, letting the cement dry, cutting the dry cement on at least one of the pieces of stock with a solvent for nitrocellulose comprising a liquid boiling at from about 30° to about 56° C. and containing a solid solvent for nitrocellulose, and an effective amount of a high-viscosity nitrocellulose whereby a skin is formed on the surface of the solvent with which the cement is moistened, which skin retards the evaporation of the solvent while the pieces of stock are being assembled, assembling the pieces of stock in the desired relation, and applying pressure, thereby disrupting the skin and terminating the retarding action so that the cement sets in not more than a few minutes.

5. That improvement in methods of manufacturing shoes which comprises applying nitrocellulose cement to one or both of two shoe parts which are to be secured together, letting the cement harden, and cutting the hardened cement on at least one of the shoe parts with a low boiling solvent for nitrocellulose containing in solution an effective amount of a high-viscosity nitrocellulose and also solid solvent for nitrocellulose, thereby slowing down the evaporation of the solvent while the shoe parts are being assembled.

6. That improvement in methods of manufacturing shoes which comprises applying pyroxylin cement to one or both of two shoe parts which are to be secured together, letting the cement harden, and cutting the cement on at least one of the shoe parts with a low boiling solvent for pyroxylin containing a cellulose derivative which slows down the evaporation of the solvent by forming a film on the surface thereof while the shoe parts are being assembled but does not substantially retard the setting of the cement when the shoe parts are assembled and pressure applied.

7. That improvement in methods of manufacturing shoes which comprises applying nitrocellulose cement to one or both of two shoe parts which are to be secured together, letting the cement harden, cutting the hardened cement on at least one of the shoe parts with a low boiling solvent of nitrocellulose containing a small amount of a high-viscosity nitrocellulose and other material tending to slow down the evaporation of the solvent while the shoe parts are being assembled, and assembling the shoe parts in the desired relation and holding them under pressure while the cement is setting.

8. That improvement in methods of manufacturing shoes which comprises applying pyroxylin cement to one or both of two shoe parts which are to be secured together, letting the cement harden, cutting the cement on at least one of the shoe parts with a solvent for pyroxylin comprising a liquid boiling at from about 30° to about 56° C. but containing pyroxylin which retards the evaporation of the solvent by forming a film on the surface thereof while the softening cement and solvent are exposed to the air thereby allowing ample time for the shoe parts to be assembled, assembling the shoe parts in the desired relation and applying pressure thereto thereby terminating said retarding action so that the cement sets in not more than a few minutes.

9. That improvement in methods of manufacturing shoes which comprises applying pyroxylin cement to one or both of two shoe parts which are to be secured together, letting the cement harden, and cutting the hardened cement on at least one of the shoe parts with a low-boiling solvent for pyroxylin containing in solution a small amount of cellulose acetate and also a solid solvent for pyroxylin thereby slowing down the evaporation of the solvent while the shoe parts are being assembled.

10. That improvement in methods of securing together pieces of stock which comprises applying cellulose acetate cement to one or both of two pieces of stock which are to be secured together, letting the cement dry, and cutting the dry cement on at least one of the pieces of stock with a low boiling solvent for cellulose acetate containing in solution cellulose acetate thereby slowing down the evaporation of the solution by forming a film on the surface thereof while the pieces of stock are exposed to the air as they are assembled.

11. That improvement in methods of manufacturing shoes which comprises applying cellulose acetate cement to one or both of two shoe parts which are to be secured together, letting the cement harden, and cutting the hard cement on at least one of the shoe parts with a low boiling solvent for cellulose acetate containing in solution a small amount of cellulose acetate and also a solid solvent for cellulose acetate thereby slowing down the evaporation of the solution while the shoe parts are being assembled.

12. That improvement in methods of cement attaching soles to shoe uppers in the manufacture of shoes wherein pyroxylin cement is applied to an outsole and to a shoe bottom and permitted to dry, which comprises applying a pyroxylin solvent containing a film forming constituent to the hardened cement on the outsole, permitting a film to form on the surface of the solvent thereby to entrap a substantial portion of said solvent in contact with the underlying cement, bringing said sole into intimate contact with the shoe bottom and breaking said surface film, thereby permitting said entrapped solvent to contact with and soften the cement on the shoe bottom, and maintaining the sole and shoe bottom in contact under pressure for a time long enough to permit the solvent to dissipate so that the sole and shoe bottom will adhere without the aid of pressure.

13. That improvement in methods of manufacturing shoes wherein adhesive is disposed between a sole and a shoe bottom and the shoe parts are brought together and maintained under pressure, which comprises bringing the sole and shoe bottom together with a cellulose derivative disposed therebetween activated with a medium of such character that it will dissipate sufficiently to permit the safe release of sole-attaching pressure after not more than a few minutes, restraining the evaporation of the activating medium by an effective amount of evaporation-retarding constituents in the activating medium until said sole and shoe bottom are brought together, maintaining said sole and shoe bottom together under pressure for not more than a few minutes, and then relieving the pressure.

14. That improvement in methods of manufacturing shoes wherein adhesive is disposed between a sole and a shoe bottom and the shoe parts are brought together and maintained under pressure which comprises applying cellulose derivative cement to one or both of said shoe parts, permitting the cement to harden, activating the cement on one or both of the shoe parts with an activating medium of such character that it will dissipate sufficiently to permit the safe release of sole-attaching pressure after not more than a few minutes, temporarily restraining the dissipation of the activating medium into the air by an effective amount of evaporation-retarding constituent in the activating medium, bringing the sole and shoe bottom together and liberating the activating medium, and maintaining said sole and shoe bottom together under pressure for not more than a few minutes.

15. That improvement in methods of manufacturing shoes wherein adhesive is disposed between a sole and a shoe bottom and the shoe parts are brought together and maintained under pressure, which comprises applying pyroxylin cement to a sole and a shoe bottom, permitting said cement to harden, activating the cement on the sole with an activating medium of such character that it will dissipate sufficiently to cause the shoe bottom and sole to adhere to each other after sole-attaching pressure has been maintained for not more than a few minutes, temporarily protecting said activating medium from evaporation by means of a film, bringing the sole and shoe together and liberating said activating medium, and maintaining said sole and shoe bottom together under pressure for not more than a few minutes.

WALTER HERBERT WEDGER.